Figure 16:
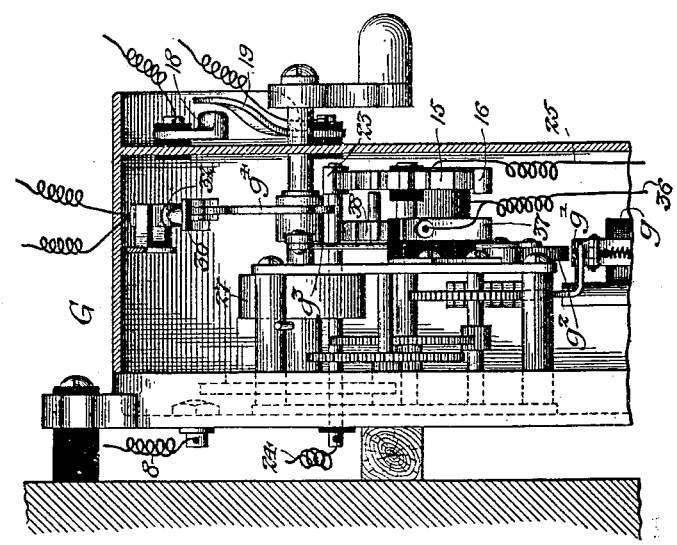

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 1.
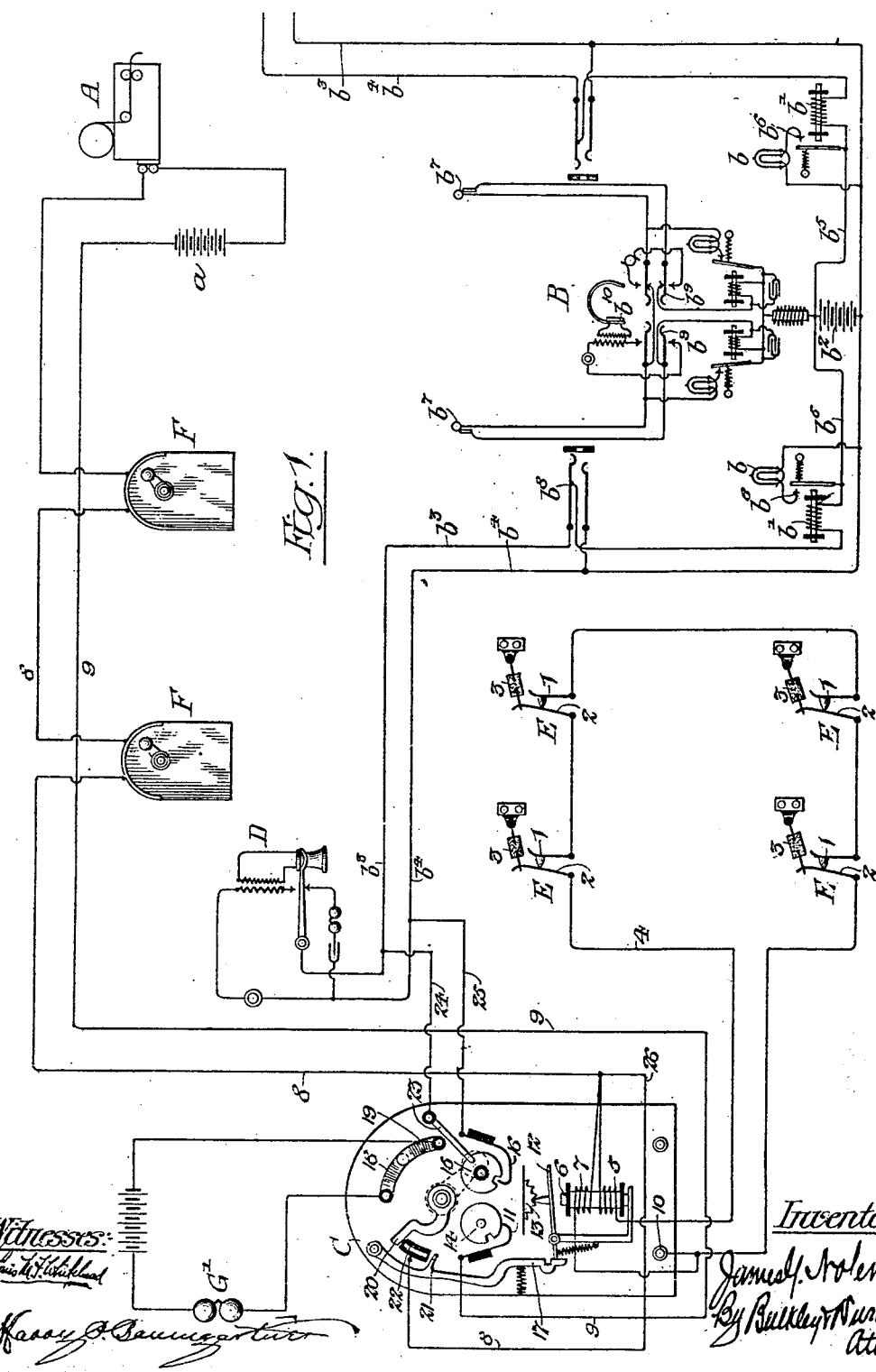

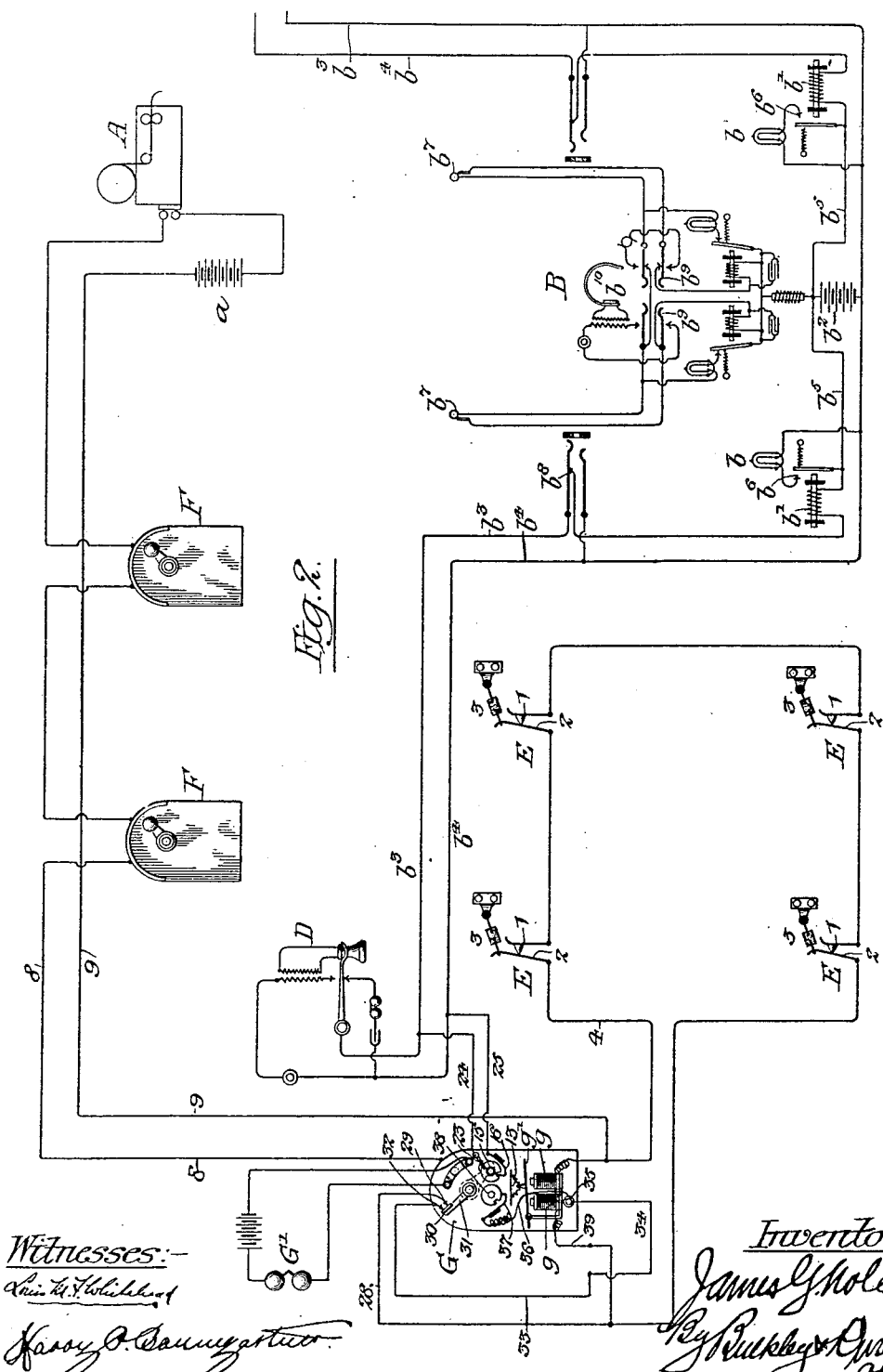

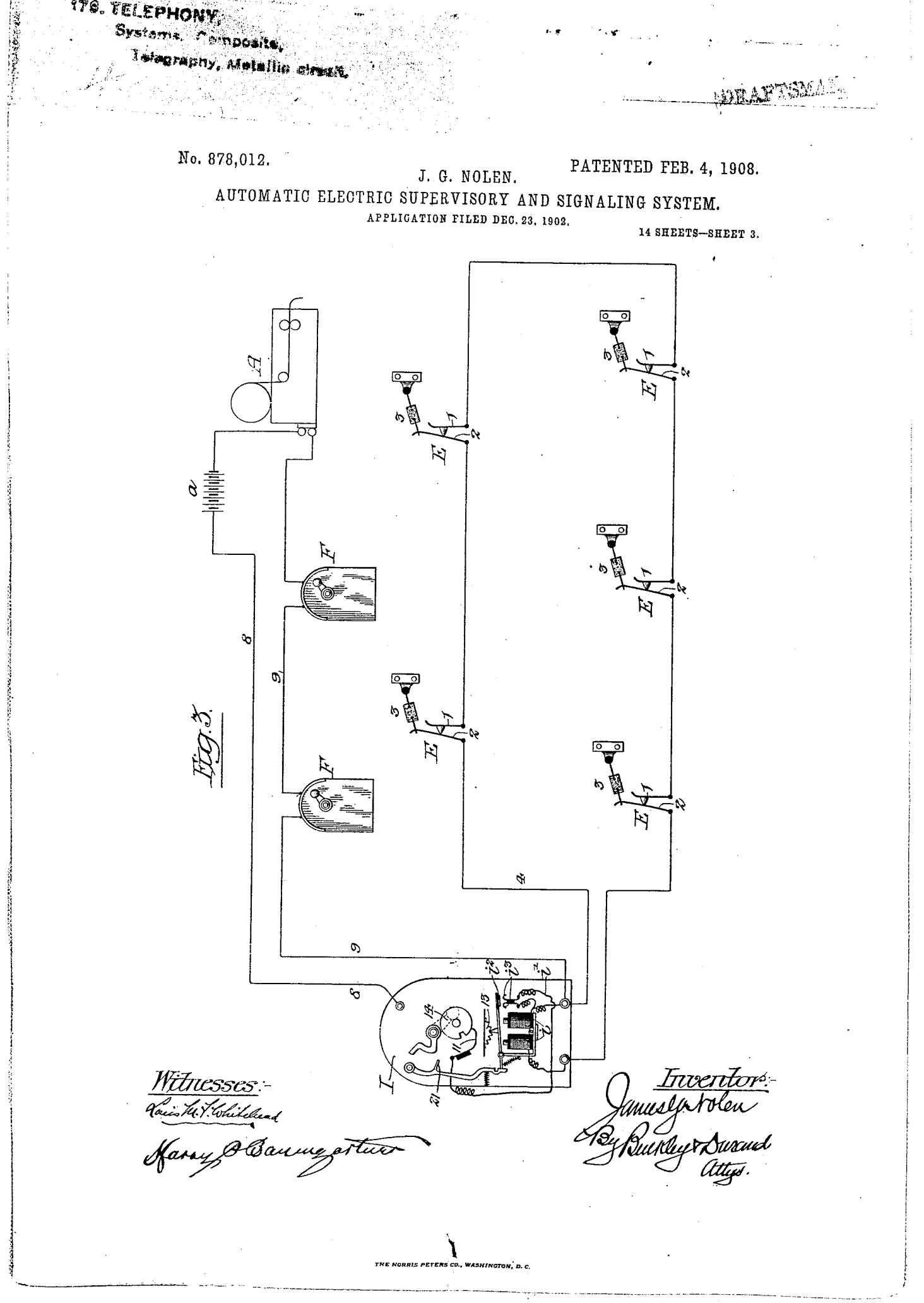

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.

14 SHEETS—SHEET 3.

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 4.
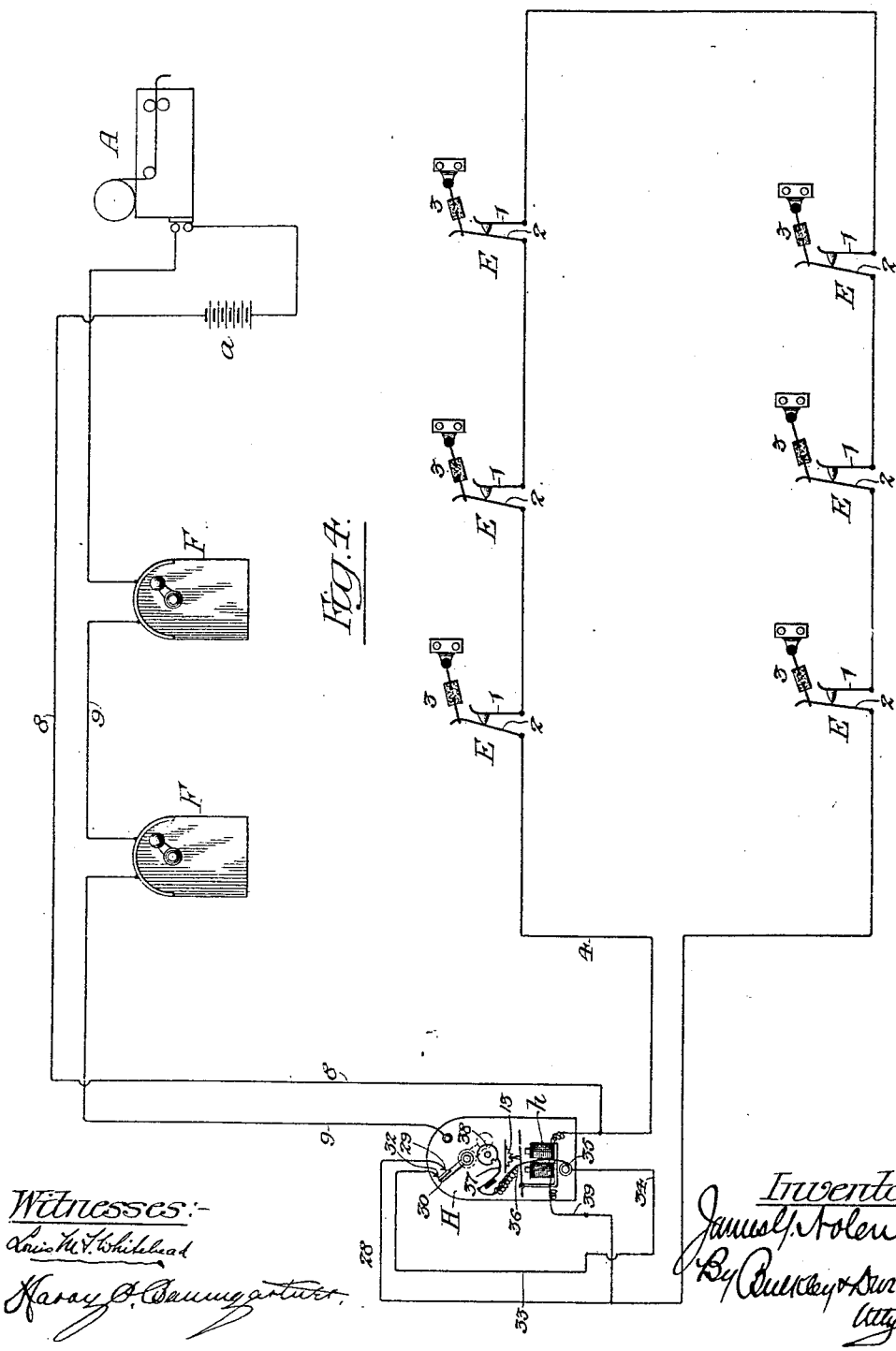

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 5.
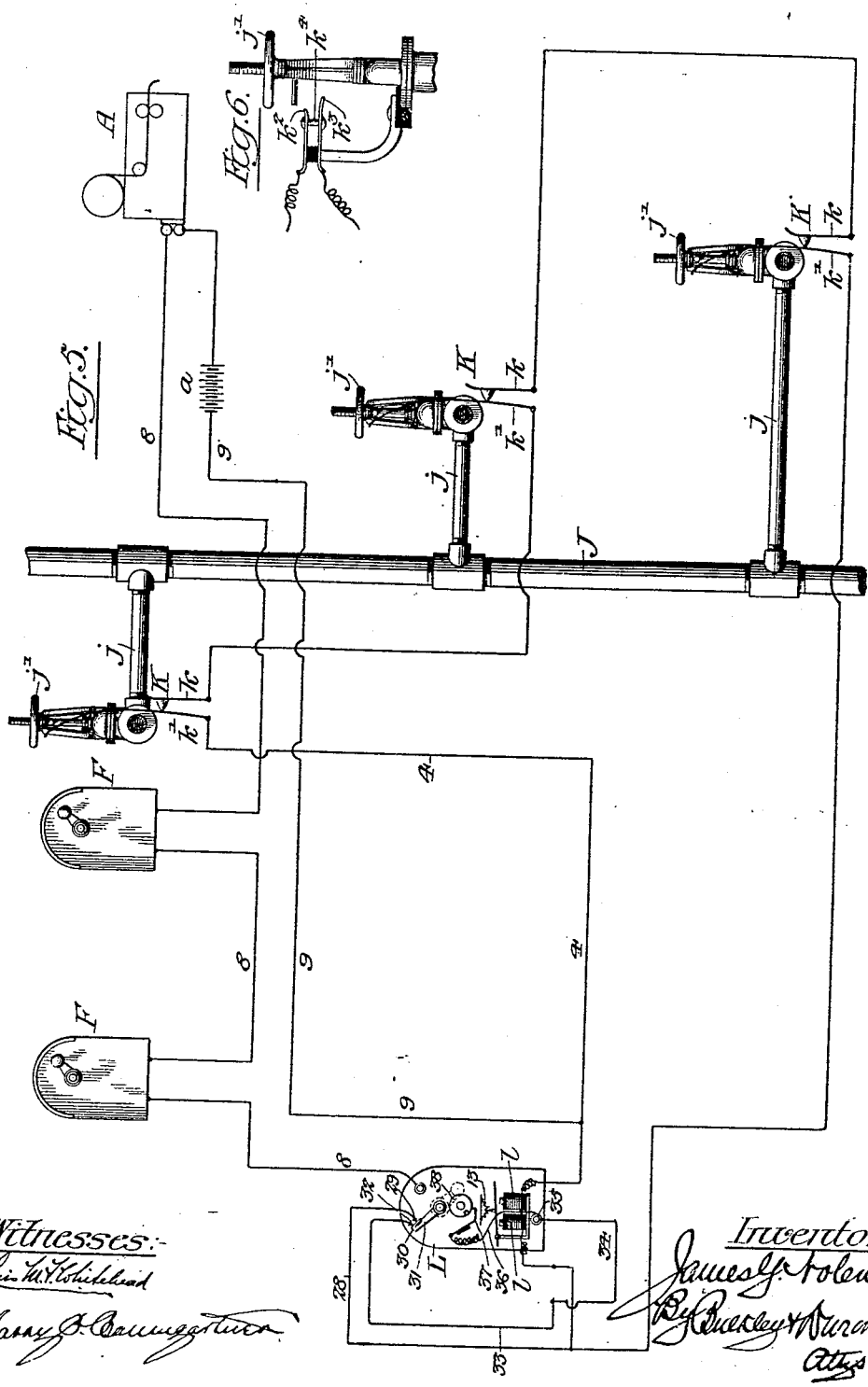

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 6.
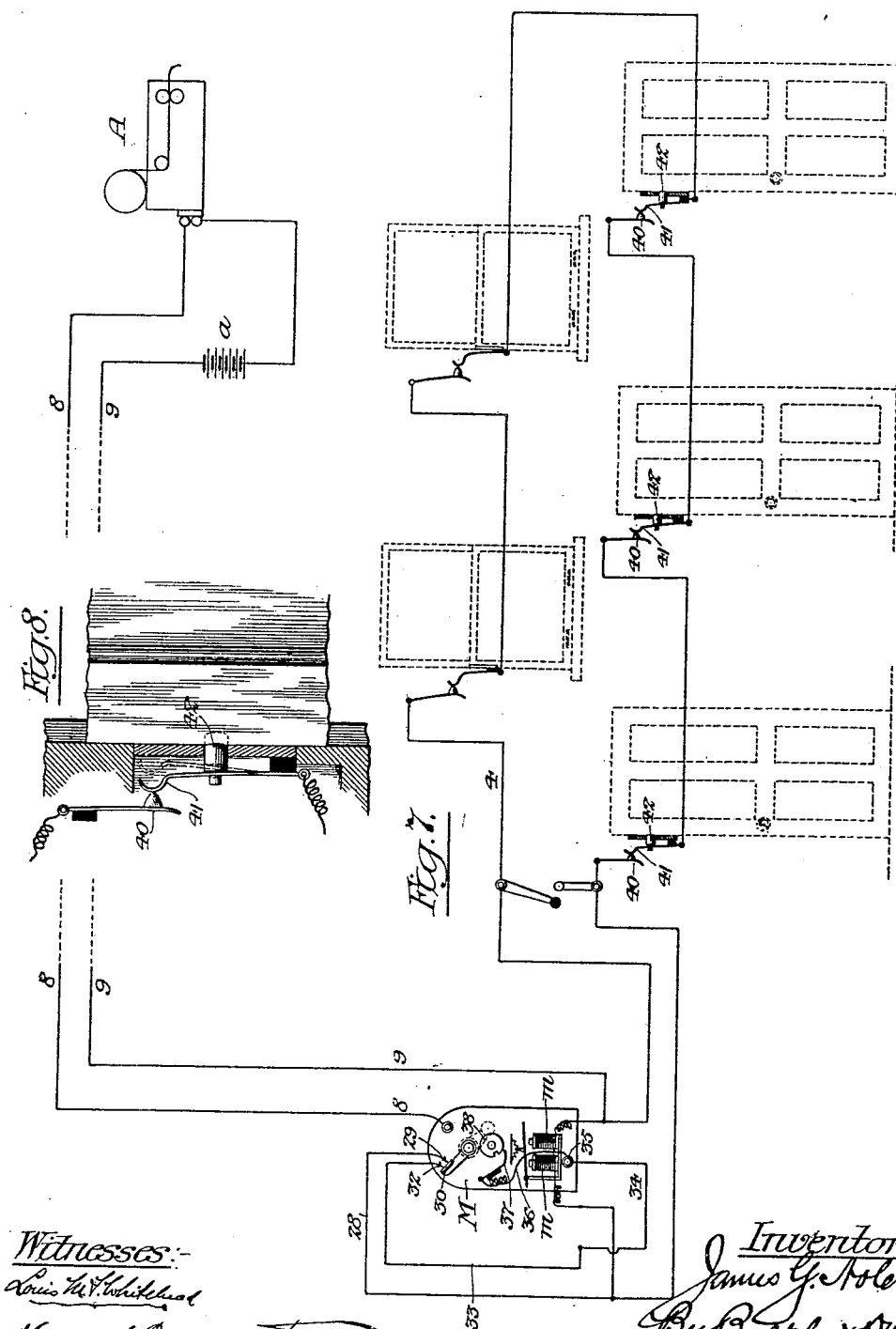

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 7.
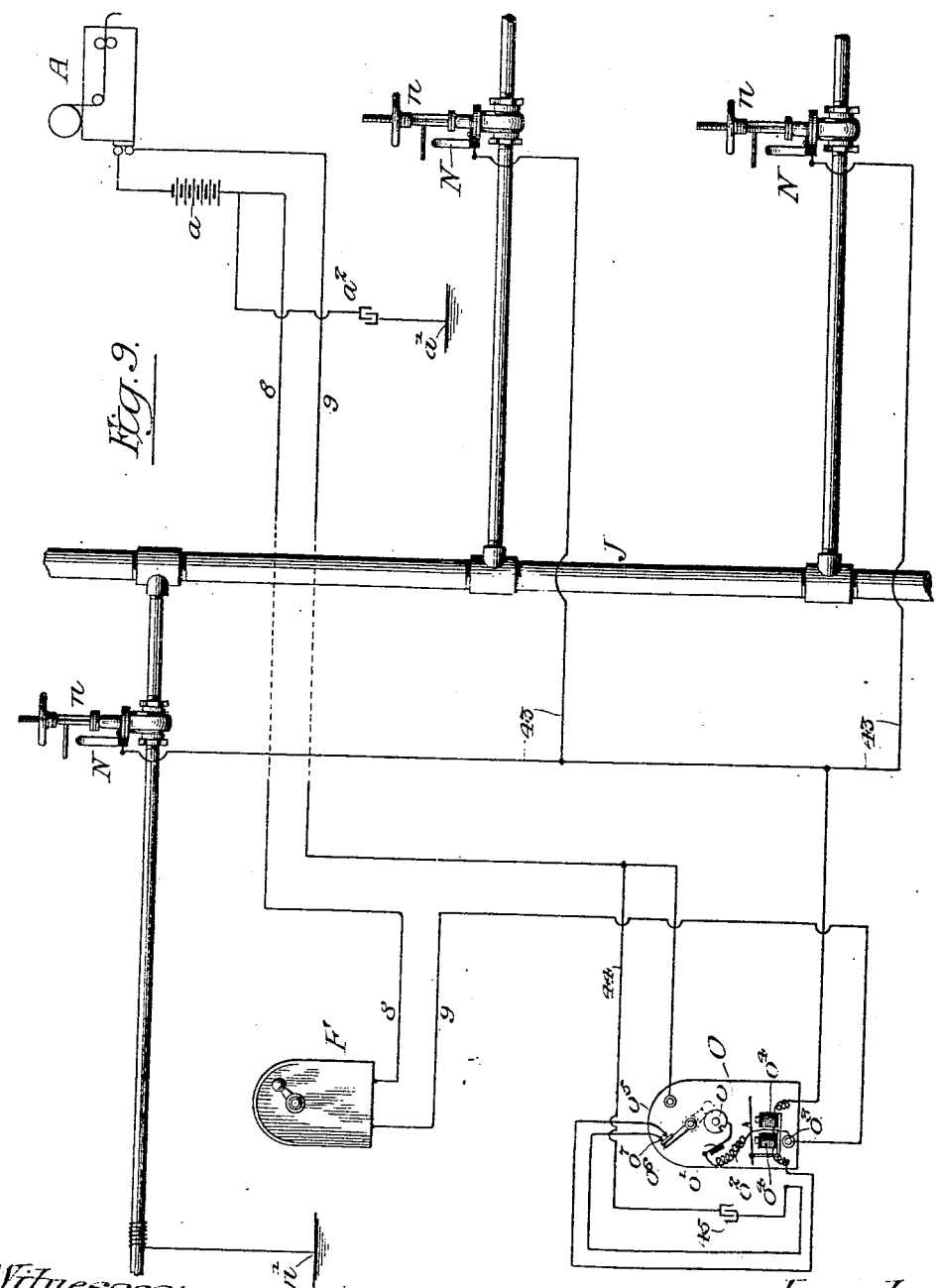

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 8.
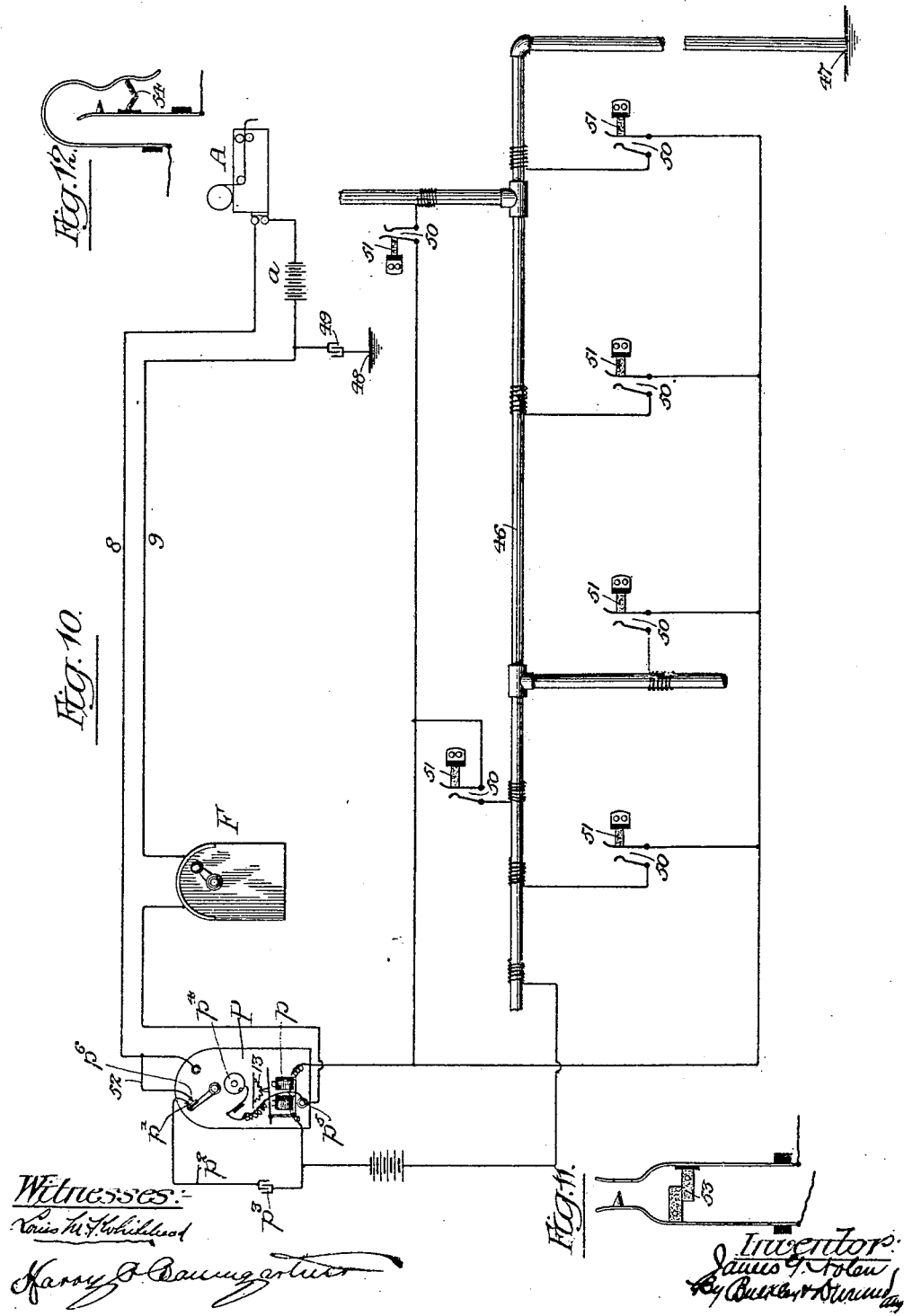

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 9.
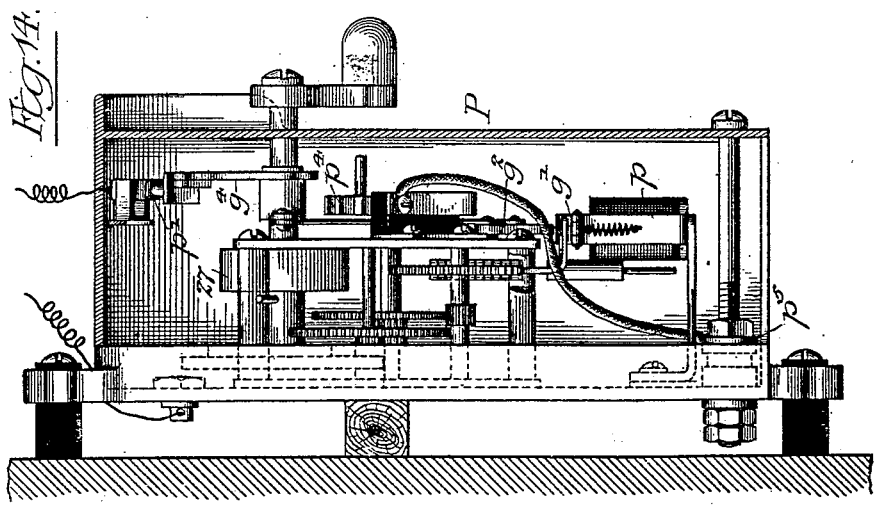
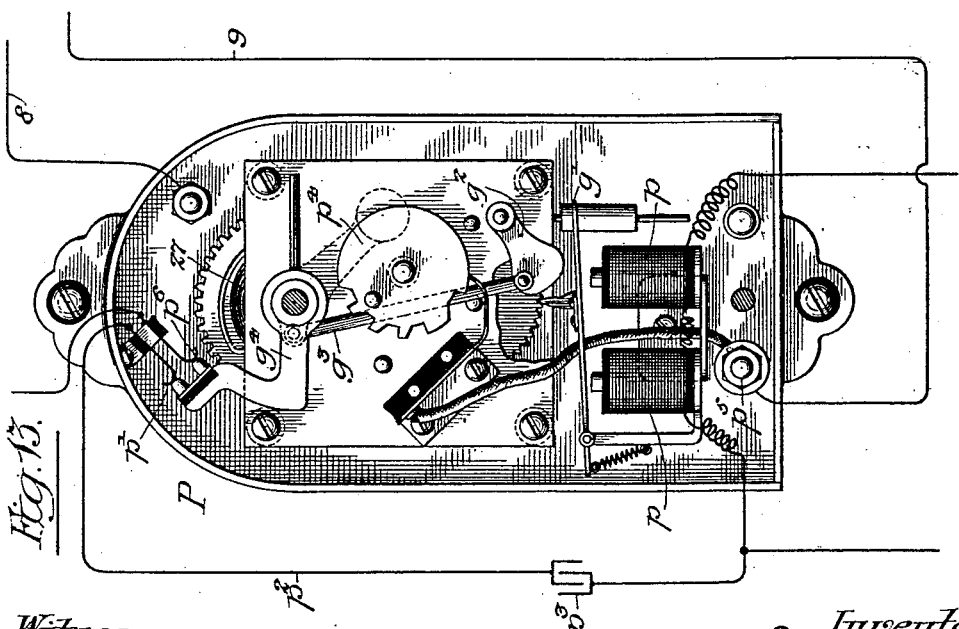

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 10.

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 11.
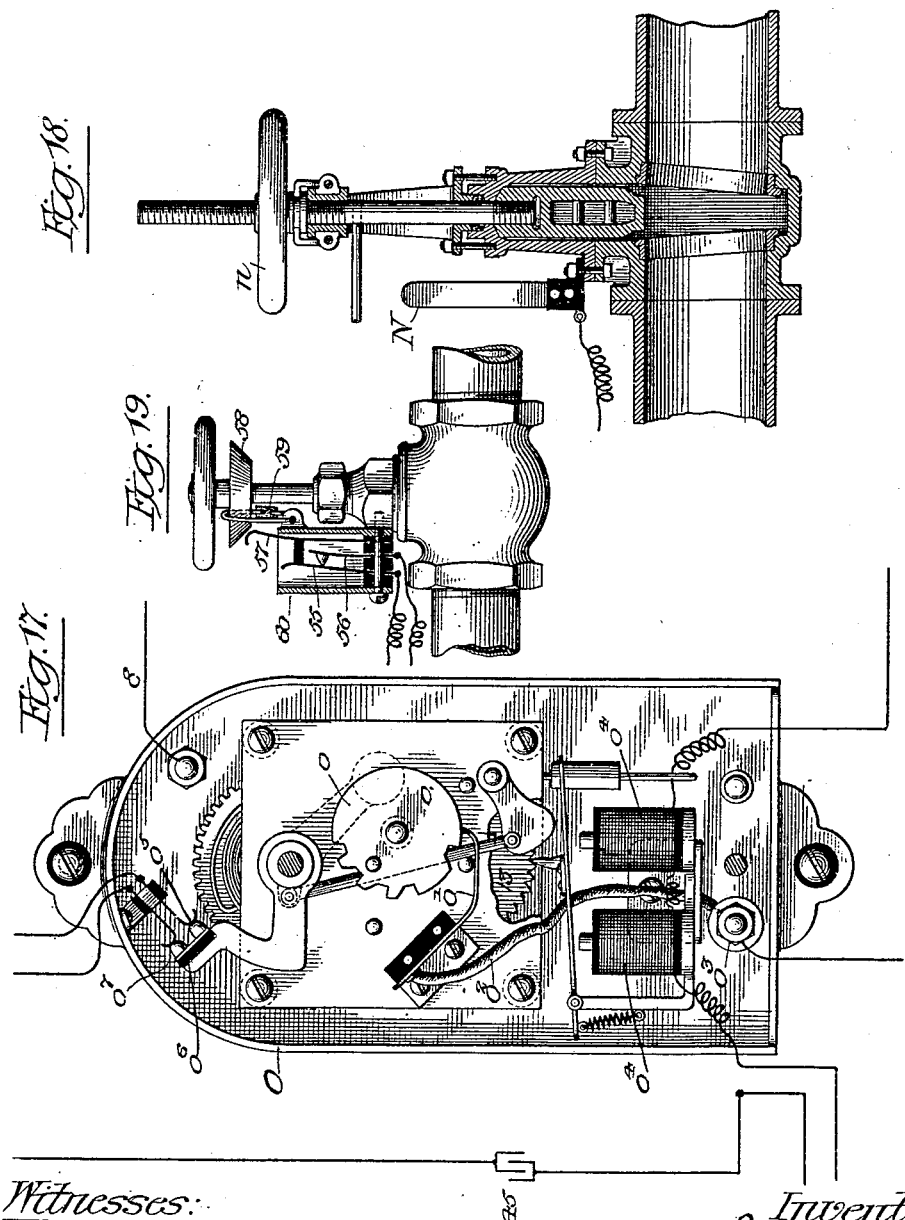

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.

14 SHEETS—SHEET 12.

Witnesses:-

Inventor:-
James G. Nolen

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 13.
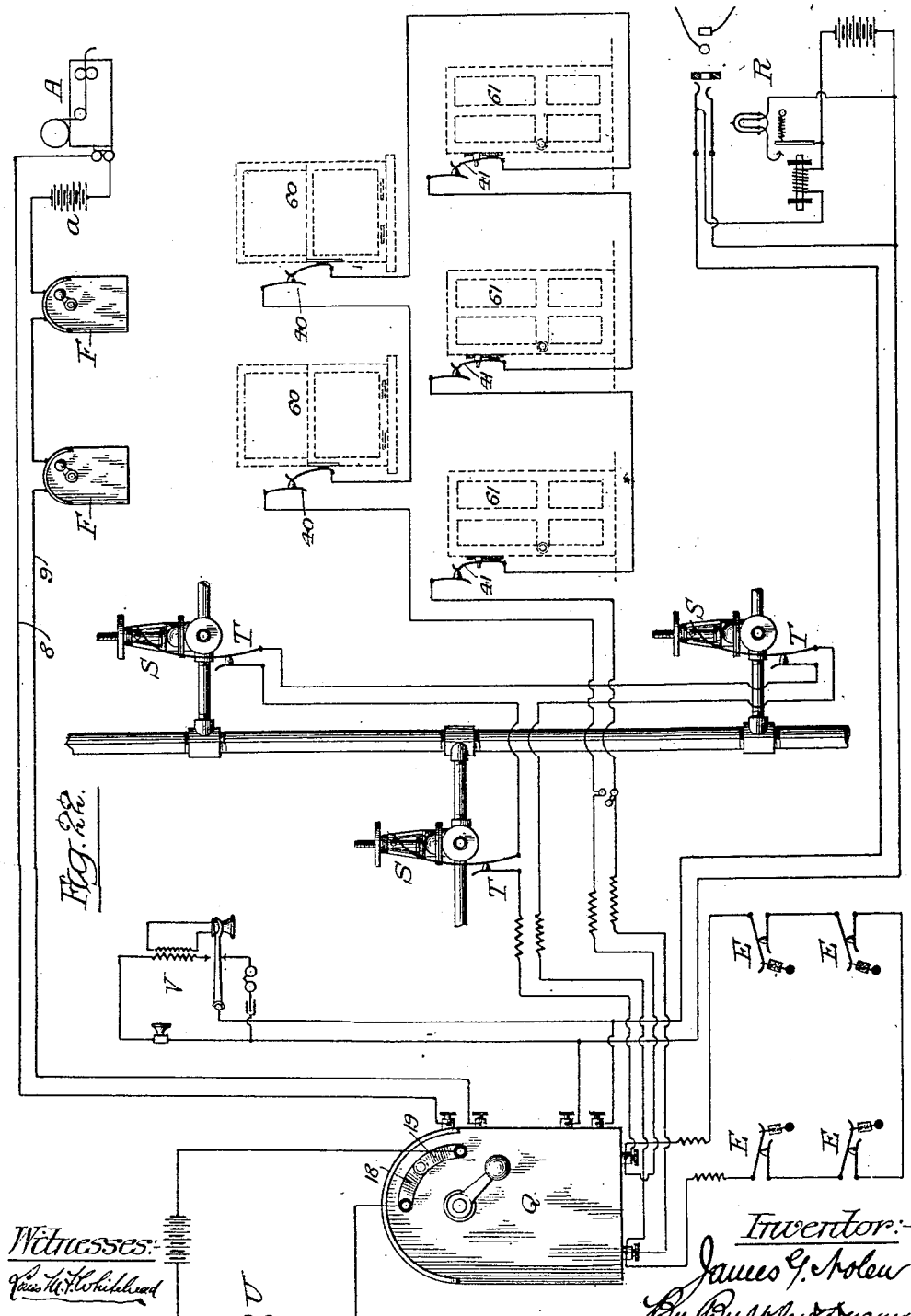

No. 878,012. PATENTED FEB. 4, 1908.
J. G. NOLEN.
AUTOMATIC ELECTRIC SUPERVISORY AND SIGNALING SYSTEM.
APPLICATION FILED DEC. 23, 1902.
14 SHEETS—SHEET 14.
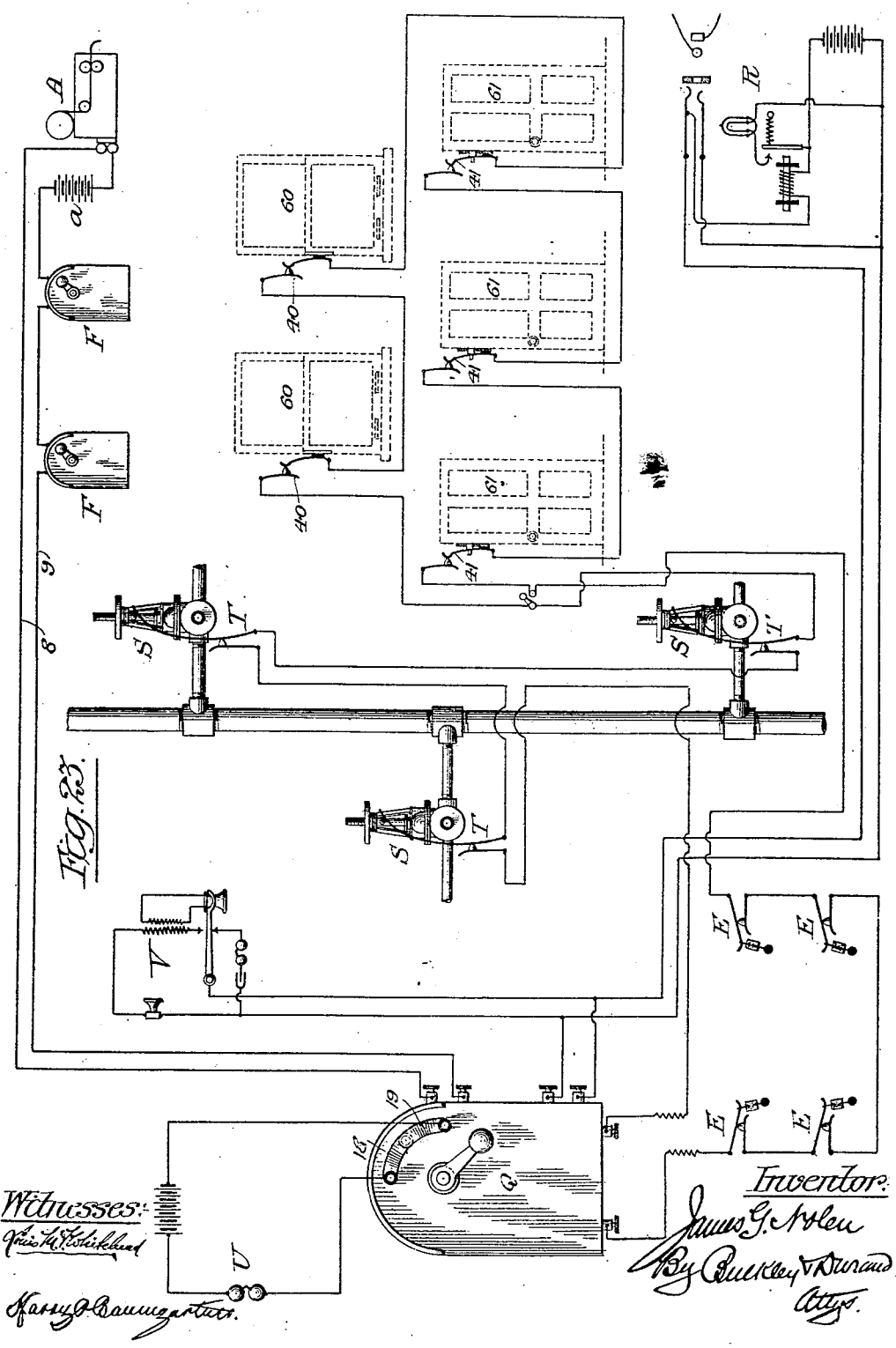

UNITED STATES PATENT OFFICE.

JAMES G. NOLEN, OF CHICAGO, ILLINOIS, ASSIGNOR OF ONE-HALF TO FRANK B. COOK, OF CHICAGO, ILLINOIS.

AUTOMATIC ELECTRIC SUPERVISORY AND SIGNALING SYSTEM.

No. 878,012.  Specification of Letters Patent.  Patented Feb. 4, 1908.

Application filed December 23, 1902. Serial No. 136,325.

*To all whom it may concern:*

Be it known that I, JAMES G. NOLEN, a citizen of the United States of America, and resident of Chicago, Cook county, Illinois, have invented a certain new and useful Improvement in Automatic Electric Supervisory and Signaling Systems, of which the following is a specification.

My invention contemplates an improved electrical system in which both a telephone operator and a district messenger operator may, in addition to their ordinary duties of connecting up telephone subscribers and receiving calls for messengers, also receive fire alarm and other signals, and have supervision over automatic fire extinguisher systems.

Generally stated, the object of my invention is to provide a system of the foregoing character which will be efficient and reliable in use, and which will also be economical to install and maintain.

A special object of my invention is to provide a simple and efficient arrangement whereby any number of circuit-breaking or closing devices, which are distributed throughout the different portions of the building, may all be connected with a single call box, or master box, as I choose to term it, and whereby the operation of any one of these circuit-breaking or closing devices will cause this single call box or master box to transmit a signal to one or more stations.

Another object is to provide an efficient arrangement whereby a number of circuit-opening devices may be located in a shunt around the electro-magnet in the master box, which magnet, when energized as a result of the breaking or opening of the shunt, causes a release of the mechanism in the master box, the latter, in such case, being normally in a pulled condition.

A further object is to provide a simple circuit arrangement whereby the aforesaid electro-magnet will be shunted out of the main circuit while the mechanism in the box is operating to transmit the signal.

It is also an object to provide an arrangement and construction whereby certain circuits may be maintained in a closed condition in accordance with the rules of the Underwriters' Association.

Another object is to provide certain details and features of improvement tending to increase the general efficiency and serviceability of an electrical system of this particular character.

To the foregoing and other useful ends my invention consists in matters hereinafter set forth and claimed.

Figure 15:
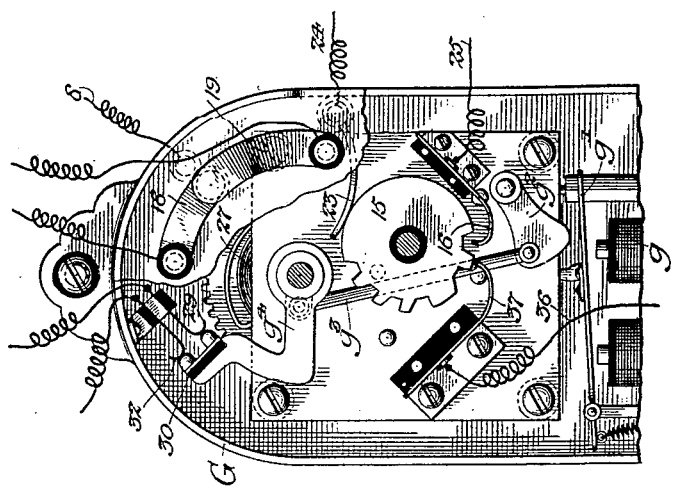
Figure 21:
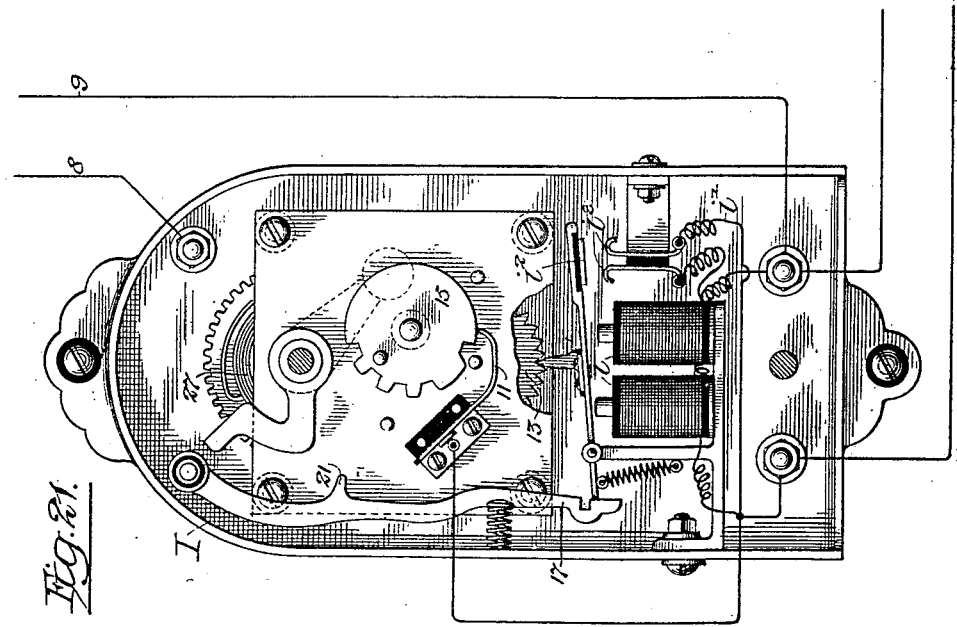
Figure 20:
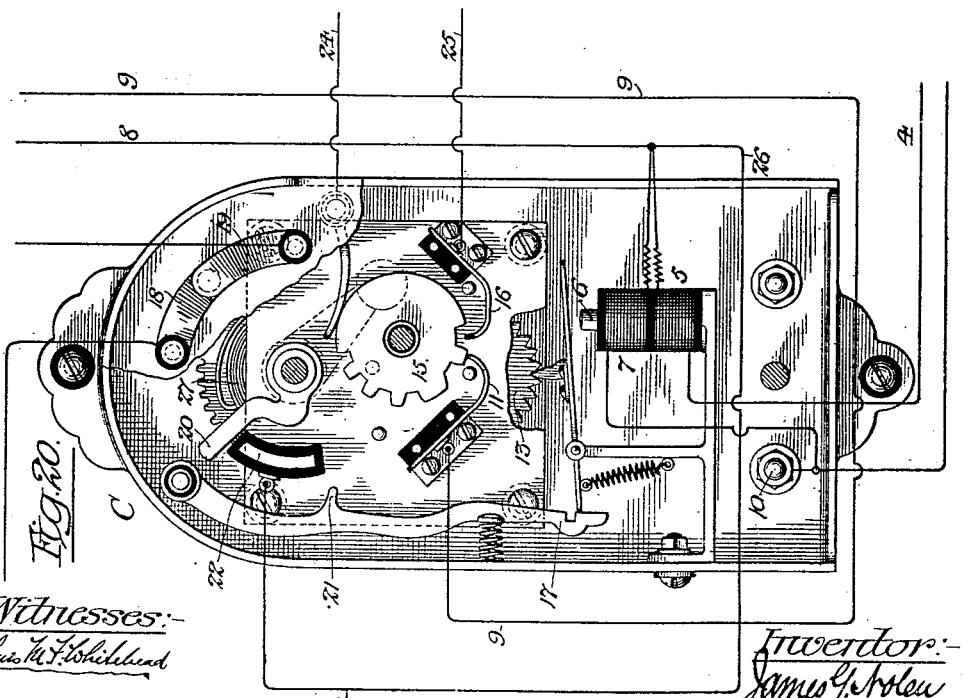

In the accompanying drawings, Figure 1 is a diagram showing a combined fire alarm, telephone and district messenger system embodying the principles of my invention. Fig. 2 is a similar diagram showing another method of connecting the shunt around the electro-magnet in the master box. Fig. 3 is a diagram showing a combined fire alarm and district messenger system embodying the principles of my invention. Fig. 4 is a diagram similar to Fig. 3, but showing the master box without any shunt connection for shunting out the electro-magnet while the make-and-break mechanism is sending in a signal. Fig. 5 is a diagram illustrating a combined district messenger system and a system of electrical supervision over an automatic fire-extinguisher system. Fig. 6 shows another form of circuit-breaking device for the system shown in Fig. 5. Fig. 7 is a diagram illustrating the application of my invention to a burglar alarm system. Fig. 8 is a detail illustrating the form of circuit-breaking device employed in the burglar alarm system shown in Fig. 7. Fig. 9 is a diagram similar to Fig. 5, except that in this case the contact devices associated with the valves are normally open, and are not in a shunt around the electro-magnet in the master box. Fig. 10 is a diagram illustrating the combined fire alarm and district messenger system in which the contacts are normally open. Figs. 11 and 12 show different kinds of circuit-closing devices for the system shown in Fig. 10. Fig. 13 is an enlarged front elevation of the master box employed in the system shown in Fig. 10, the front or cover of the box being removed, so as to show the internal mechanism. Fig. 14 is a side elevation of the box shown in Fig. 13, the casing being broken away for the purpose of exposing the internal mechanism. Fig. 15 is an enlarged front elevation of the upper portion of the master box employed in the system shown in Fig. 2, the front of the box being removed to show the internal mechanism. Fig. 16 is a side elevation of the mechanism shown in Fig. 15. Fig. 17 is an enlarged front elevation of the master box mechanism employed in the system shown in Fig. 9. Fig. 18 is an enlarged detailed sectional view of the valve mechanism and circuit-closing device shown in Fig. 9. Fig. 19 shows a form of circuit-breaking device which is applicable to the system shown in Fig. 5. Fig. 20 shows the form of call box mechanism shown in Fig. 1. Fig. 21 shows the form of call box mechanism shown in Fig. 3. Fig. 22 is a diagram showing a master box with three shunts around the electromagnet, one shunt being provided with the fusible fire alarm connections, the second shunt including the burglar alarm device, and the third shunt including the contacts for maintaining supervision over an automatic fire extinguisher system. Fig. 23 is a diagram showing a master box, similar to the master box shown in Fig. 22, and showing also the three kinds of circuit-breaking devices, to wit, the heat-responsive switches, the valve-operated switches, and also the door-and-window-operated switches, and in this diagram these switches are all connected in such manner as to effect the same results as those illustrated in Fig. 22—that is to say, each switch, when operated, is capable of causing the master box to transmit a signal over both the district messenger line and the telephone line. In Fig. 23, however, the different kinds of switches or circuit-breaking devices, are all connected in series in one large shunt, rather than in a plurality of shunts, which latter is the case in Fig. 22. In Fig. 22, the resistances of the different shunts can be regulated, as by inserting the resistance coils illustrated in this figure, so as to cause a sufficient amount of current to flow through the relay in the master box whenever one of the shunts is opened or broken. In Fig. 23 this regulation of the resistance is, however, unnecessary—that is to say, it is only necessary that one large shunt, in which all of the different kinds of switches are connected in series, be of lower resistance than the coils of the relay in the master box, inasmuch as this one shunt constitutes the only short circuiting path around the said relay.

Referring to Fig. 1, which, as previously stated, illustrates a combined telephone, fire alarm and district messenger system, A indicates the signal-receiving and recording device, which is located at the central station of the district messenger system. B indicates generally the switchboard apparatus located at the exchange or central station of an ordinary common-battery telephone system. C indicates the master box, which is located at the subscriber's station—that is to say, the station at which the sub-station telephone apparatus is located, and which is, therefore, connected both with the telephone exchange station and also with the central station of the district messenger system. E indicates the automatic circuit-breaking devices, which are also located at the subscriber's station, but which are distributed in different portions of the building. F indicates the ordinary call boxes of the district messenger system, these boxes being connected in the ordinary manner with the signal-receiving and recording device A at the central station. The purpose of the different instrumentalities thus organized into one system, and also the general method of operation of the same, may be first explained, so that the general purpose or utility of the invention may be better understood when the specific construction is hereinafter described.

The construction and arrangement is such that should the subscriber's building or sub-station catch on fire, the heat at any part of the building will cause one of the devices E to open the circuit in which they are located, thereby causing the master box C to be set in operation. This master box is normally in a pulled condition, and when thus automatically released transmits a distinctive signal over the line to the signal-receiving device A at one station, and also over the subscriber's telephone line to the switchboard line signal b at the other central station. And in addition to this, the operation of the master box causes a local alarm to be sounded, such, for example, as the bell G'. As stated, the signal transmitted over the telephone line to the switchboard operator is of a distinctive character—that is to say, of a very different character than the ordinary call for a telephone connection. This is also the case with the signal transmitted to the operator at the central station of the district messenger system, and in this way neither operator has any difficulty whatever in distinguishing the fire alarm signal from the ordinary call for a telephone connection, or for the ordinary call for a messenger.

Now, the specific construction involved in the system shown in Fig. 1, is as follows: First, the make-and-break devices E, each consist of a stationary contact 1, and a spring contact 2, the two contacts being held normally together by means of a suitable connection 3. This connection is preferably of such a character that it will weaken and break upon the application of heat. In other words, it is of such a nature that it will at least give way and allow the spring contact 2 to move away from the stationary contact 1, upon a rise of temperature in its immediate locality, say to the point of 125° Fahrenheit. Thus each circuit-opening device E is capable of opening the shunt 4 when the temperature in the building rises above the normal, as, for example, in case of fire. This shunt, it will be seen, is connected in series with one of the windings 5 of the differential relay 6. The other winding 7 of this relay is in the main or call-box circuit of the district messenger system. This main or call box circuit includes the line conductors 8 and 9 leading respectively from the station at which the signal-receiving device A is located to the casing of the master box at 10, and to the insulated spring contact finger 11 of said box. Thus it will be seen that the coil 7 of the differential relay is in a line conductor 8, and that the coil 5 and the circuit-opening devices E are in a shunt or parallel connection around this coil 7. The armature 12 of this differential relay is normally in contact with the escapement 13, which is a well known element of an ordinary call box. This master box is also provided with a pair of rotary contact disks 14 and 15, the first electrically connected with the casing of the box and arranged to have its periphery engaged by the spring contact finger 11. The other disk is insulated from the box, and is engaged by the other spring finger 16.

A locking device in the form of a notched arm 17 is provided, said device being adapted to catch and hold the armature 12 in a depressed condition, after the armature has been attracted and drawn downward by the magnet of the relay. The master box is also provided with a couple of insulated spring contacts 18 and 19, adapted to be brought together by the handle of the master box when the latter is released and allowed to swing around in an anti-clockwise direction. The main or crank shaft of the master box is also provided with an arm 20, which engages the upper end 21 of the locking lever 17 when the handle is released, and which thereby automatically unlocks the armature 12, so as to allow the latter to assume its normal position in engagement with the escapement wheel 13. When released, the arm 20 on the crank shaft is also adapted to slide over and make contact with the contact piece 22. The insulated contact disk 15 is electrically connected with the subscriber's telephone line through the medium of the insulated contact finger 23 and the conductor 24. The spring finger 16 is connected with the other limb of the subscriber's telephone line through the medium of the conductor 25. A normally open shunt 26, extending around the differential relay, connects at one end with the line conductor 8, and at the other end with the contact 22. The usual battery or other source of current supply $a$ is preferably located in the line which terminates at the central station having the signal-receiving and recording device A.

The telephone apparatus, both at the subscriber's station and at the exchange or central station, can be of any known, suitable or approved character. Preferably, however, as stated, the switchboard apparatus involves a line signal $b$, adapted to have its circuit closed by the line relay $b^1$. The current for energizing this relay, and also for lighting the said lamp, is supplied from the battery $b^2$, which is located at the central station or exchange. The switchboard apparatus can be connected with the sub-station apparatus by means of the two line conductors $b^3$ and $b^4$.

Now, with the foregoing construction, the circuits and operations are as follows. Suppose the building in which the subscriber's line or substation is located catches fire. The rise of temperature in any one of the rooms of the building will cause one of the connections 3 to weaken and break, thereby allowing one of the springs 2 to move away from the stationary contact 1. This, of course, opens the shunt circuit 4, allowing all of the current of the normally closed line circuit, in which the battery $a$ is included, to flow through the winding 7 of the differential relay. As long as the current continues to flow through both coils of this relay, it, of course, remains unenergized and incapable of setting the master box in operation. But as soon as the shunt is opened, then, as stated, all of the current is caused to flow through one coil of this relay, thereby causing it to become energized sufficiently to attract its armature 12. Now, as previously explained, this master box C is normally in a pulled condition and is locked in such condition by the armature 12. So as soon as this armature is drawn away from the escapement 13, the spring 27 of this master box starts to unwind, and in unwinding produces a rotation of the two disks 14 and 15 through the medium of suitable gearing. This rotation of the two disks continues, and is in no way interrupted by the said armature, inasmuch as the arm 17 catches and holds the armature in its depressed condition. The two disks rotating in this manner coöperate with the spring fingers 11 and 16 to produce the well known make-and-break action, which is characteristic of devices of this nature.

The make-and-break action produced by the disk 14 and the spring contact finger 11 causes an intermittent make-and-break of the circuit including the signal-receiving device A, and consequently a signal is transmitted over the line to the operator at the central station of the district messenger system. In order to prevent confusion of signals, this make-and-break action can be of a character to produce a distinctive signal— that is to say, a signal very different from that produced by the mere pulling of one of the ordinary call boxes F. In this way, the district messenger operator is enabled to distinguish between a fire alarm signal and an ordinary call for a messenger. During the unwinding of the spring in the master box and the consequent rotation of the crank handle, shown in dotted lines, the arm 20 on the crank shaft slides over the contact 22, thereby closing the shunt 26, which extends around the differential relay. Thus, during the operation of the master box, the differential relay is out of the circuit, and the make-and-break action is confined to a line circuit which includes no unnecessary resistance, or no devices which will in any way interfere with the transmission of the signal. In addition to the signal thus transmitted to the district operator, the rotary disk 15 and the spring contact finger 16, coöperate to produce a similar make-and-break action, and a consequent transmission of a signal, from the master box over a subscribers' telephone line to the switchboard operator at the exchange or central station of the telephone system. The intermittent opening and closing of the telephone line circuit produce an intermittent energizing of the line relay $b^1$, and a consequent intermittent flashing or glowing of the line lamp $b$, due to the vibratory movement of the armature against the contact $b^6$. The signal thus given by the line lamp signal of the telephone switchboard apparatus is so different in character from the ordinary call for a connection that the telephone operator has no difficulty whatever in distinguishing between the two kinds of signals. It is, of course, possible for the subscriber to produce a similar intermittent flashing or glowing of the line lamp, but it will be readily understood that the make-and-break effect in the line circuit, produced by the disk 15 and spring finger 16, can be of a predetermined character, and of a nature very different from anything that it would be possible for the subscriber to produce by simply vibrating the telephone hook switch. But even if there should be any uncertainty as to the significance of the signal given by the line lamp, the operator can then insert the answering plug $b^7$ in the jack $b^8$, and by then pressing her listening key $b^9$, so as to connect her head telephone $b^{10}$ with the line, she can then plainly hear the rumbling or rattling sound produced by the operation of the master box. She then knows, of course, that the signal is an alarm of fire and not a call for connection with some other telephone subscriber. Thus, the single call box, or master box as I prefer to term it, is capable of responding to the action of a great number of automatic circuit-breaking devices, such as the devices E, and in this way the fire alarm apparatus involves practically a minimum number of devices. The ordinary call boxes F can be of the usual form or construction. This is also true of the master box, with the exception, of course, that in this case it is provided with the additional disk 15 and contact finger 16, and also with the differential relay, and the locking arm 17. The shunt connection and contact 22, together with the normally separated contacts 18 and 19, are also devices not usually found in the ordinary call box. But otherwise, as stated, this master box may be constructed in the same manner as the boxes F.

Figs. 13 and 14 illustrate a well known form of call box mechanism, with the exception of the addition of a relay with a locking armature, and also of a couple of additional contacts. With these exceptions, the form of call box mechanism shown is the kind which I prefer to employ in each and every case where a call box is hereinafter illustrated. It will be understood, however, that I do not limit myself to any particular form of call box mechanism.

In Fig. 2, the results accomplished, as far as signaling is concerned, are substantially the same as Fig. 1. In Fig. 2 the master box, however, has a somewhat different construction. As illustrated, the master box G in Fig. 2 is provided with an ordinary relay $g$, instead of the differential relay employed in Fig. 1. Furthermore, in Fig. 2 there is no shunt which is automatically closed to cut out the relay when the box is set in operation. In this instance, when one of the circuit-breaking devices E is operated, it throws all the current from the battery $a$ through the relay $g$, which being thus energized attracts the armature and releases the escapement, as in the previous construction. Normally, the current in the said battery finds a path of least resistance through the two line conductors, and through the shunt 4, as in the previous case, the current normally flowing through this shunt and the conductor 28, thence through the contact and the insulated contact 30 on the crank shaft arm 31, thence through the other contact 32, through the conductor 33, through the conductor 34 and the insulated binding post 35, through the conductor 36 and the contact finger 37, and thence through the disk 38 and the casing of the box to the other line conductor 8. But when the shunt 4 is broken, the current then flows from the line conductor 9 through the coils of the relay $g$, thence through the conductors 39 and 34 to the binding post 35, and thence out through the make-and-break devices through the casing of the box to the other line conductor 8, the contact on the arm 31 having moved away from the contacts 32 and 29. Thus, the box G is set in operation, in the same manner that the master box C is set in operation in Fig. 1. The make-and-break action in the two circuits, that of the district messenger system and the telephone system, causes the transmission of signals in the manner already described.

Figs. 15 and 16 illustrate the call box construction employed for the master box G. In this case, the armature $g^1$ of the relay is, after the box has been set in operation, held away from the escapement by the arm $g^2$ which is held against the armature by the rod $g^3$, the latter having its upper end secured to the arm $g^4$ on the rotary crank shaft. With this arrangement, the arm $g^2$ is pressed and held against the armature as soon as the crank shaft starts to revolve.

In Fig. 3, the master box I is substantially the same as the master box shown in Fig. 1, with the exception that an ordinary relay $i$ is employed in place of the differential relay in Fig. 1, and with the further exception that no local alarm contacts are employed. Furthermore, in Fig. 3, there is no second make-and-break device in the master box I, inasmuch as in this diagram no telephone connections are shown. A special arrangement in the master box I consists of the normally-open shunt $i^1$, adapted to be closed by the contact $i^2$ on the armature of the relay. When this relay is energized as the result of the automatic operation of any one of the circuit-breaking devices E, this contact $i^2$ makes contact with the two contacts $i^3$, thereby closing the shunt which extends around the relay magnets. This, of course, then operates to cut out the magnets during the operation of the box. The construction of this master box I is illustrated on an enlarged scale by Fig. 21.

In Fig. 4, the automatic operation of one of the fusible circuit-breaking devices only operates to transmit a signal to the district messenger operator, or to the station at which the signal-receiving and recording device A is located. The master box H in Fig. 4 can be the same as the master box shown in Fig. 2, with the exception, of course, that the second make-and-break device is not necessary. Furthermore, in the master box H no provision is made for closing the circuit of the local alarm $G^1$, which latter is a feature of the circuit arrangements shown in Figs. 1 and 2. As in Fig. 2, the automatic circuit-breaking devices E are arranged in the shunt 4, which extends around the relay $h$ in the master box, and which when broken throws the entire flow of current through this relay for the purpose of setting the master box in operation. When set in operation, this master box H only transmits a signal over the line to the signal-receiving device A.

In Fig. 5, I have illustrated the application of my improved signaling system to the supervision of an automatic fire extinguisher system. In this figure, J represents the ordinary vertical pipe or riser, as it is called, of an automatic fire extinguisher system, while $j$ indicates the horizontal or branch pipes extending from the said riser. In a fire extinguisher system it is usual to provide a suitable number of valves $j^1$ for controlling the flow of water through the piping. When these valves are open, the water is free to flow through the piping and discharge from the sprinkling heads, should the latter be automatically opened or released by fire. It is obvious then, of course, that the accidental or malicious or intentional closing of one or more of these valves, might produce very serious results. For example, should one or more of these valves be closed, so as to cut off the water supply, then the building in which the system is located will not be properly protected against fire. In other words, as soon as the water is turned off in the pipes, the release or opening of any of the sprinkler heads will not produce the desired discharge of water. Now in order that an effective supervision may be maintained over an automatic fire extinguisher system of this character, I associate a contact-breaking device K with each valve, each device consisting of a stationary contact $k$ and a spring contact $k^1$. These circuit-breaking devices are all serially connected in the shunt 4, which is connected with the master box L in the same manner as the shunt 4 is connected with the master box H in Fig. 4. In fact, the construction of the master box L can be substantially the same as the said master box shown in Fig. 4. Each spring $k^1$ is arranged in position to be engaged by a pin or projection on the stem of the adjacent valve. Consequently, when a valve is closed, the contact device allotted to such valve operates to open the shunt 4, thereby causing all of the current from the battery $a$ to flow through the electro-magnet $l$ of the master box. The flow of current, thus shifted to a path including the coils of said relay, operates to automatically release the master box. The said box, when set in operation, then transmits a signal over the line to the signal-receiving and recording device A. The district messenger operator, observing this signal, then understands that one of the valves in the fire extinguisher system has been either intentionally or otherwise closed, and that the system, or at least some portion of it, has been rendered inoperative, as far as putting out a fire is concerned. The operator can then, of course, advise the owner of the building, or other interested parties, as to the condition of the fire extinguisher system.

In Fig. 6, the circuit-breaking device consists of a pair of springs $k^2$ and $k^3$ normally connected by a rivet or other like connection $k^4$. When the valve is closed, the pin on the valve stem engages the projecting portion of the spring $k^3$, and the connection $k^4$ is then broken. This, of course, operates to open the shunt circuit, in the same manner that the closing of one of the valves operates to open the shunt circuit in Fig. 5.

In Fig. 7, the circuit arrangement is substantially the same as in Fig. 4. In Fig. 7, however, the circuit-breaking devices in the shunt are applied to the doors and windows of a house, rather than to valves in a fire extinguisher system, and rather than to fusible connections. With this arrangement, each door or window is capable, when opened, of automatically breaking the shunt 4, and thereby energizing the magnet in the master box M. The circuit-breaking device for this particular apparatus may be of any suitable character. For example, each device may consist of a stationary contact 40, the movable contact 41, together with the plunger 42 adapted to engage the edge of the door or window. With this arrangement, the contacts of each circuit-breaking device are normally closed or held together when the doors and windows are closed. But should a door or window be opened, then the contacts allotted to such door or window will be allowed to separate, thereby opening the shunt, and thereby energizing the magnet $m$ in the master box. The energizing of this magnet sets the normally pulled box in operation in the manner previously described. This master box M can be the same as the master box shown in Fig. 4.

In Fig. 9, I have illustrated another circuit arrangement for supervising an automatic fire extinguisher system. In this case, the circuit-closing devices N, which are associated with the valves $n$, are located in a normally open grounded circuit, which includes one of the limbs of the main line circuit extending between the subscriber's station and the central station of the district messenger system. Normally, the line circuit of the district messenger system is closed from one limb of the line through the casing of the master box O, through the disk $o$ and contact finger $o^1$, and through the conductor $o^2$ and the insulated binding post $o^3$ to the other side of the line. This closed circuit includes the usual battery or generator $a$, and also the signal-receiving and recording device A at the central station. One side of the line at the central station is grounded at $a^1$, the ground connection containing a condenser $a^2$. The system of piping is grounded at $n^1$, while all of the springs of the circuit-closing devices N are electrically connected by the conductors 43 with the electro-magnet $o^4$ in the master box O. The other side of this magnet is connected with a stationary contact $o^5$, adapted to bear against a contact $o^6$ on an arm mounted on the crank shaft. One of the line conductors is connected with the other stationary contact $o^7$ through the medium of the conductor 44 and the condenser 45. The system may, of course, contain one or more of the ordinary call boxes F. With this arrangement, a closing of one of the valves $n$ will close the grounded circuit including the two condensers $a^2$ and 45, the battery $a$ and the electro-magnets of the relay $o^4$. Both of the condensers are, it will be seen, normally connected through a continuous conductor with opposite sides of the battery, and thus the condensers are normally charged, so to speak, and when the grounded circuit is thus closed the static effect of the current is utilized to produce a momentary impulse of current through the circuit sufficient to energize the relay $o^4$. This relay then attracts its armature and releases the mechanism of the master box, the same as the mechanism is released in the box shown in Fig. 4. The grounded circuit, as shown, for thus operating the relay, includes the circuit-closing device N, and also the piping of the extinguisher system.

Referring to Figs. 10, 11 and 12, it will be seen that a grounded condenser circuit of the character shown in Fig. 9 is also applicable to a system in which the circuits include normally separated contacts adapted to be closed by the weakening or giving way of fusible connections. In Fig. 10, an arrangement is shown in which the piping 46 of the automatic fire extinguisher system is utilized as a part of the grounded condenser circuit. This piping, it will be seen, is connected to ground at 47. The master box P is substantially the same as the master box shown in Fig. 9. The ordinary call box F is also of the character previously illustrated and described. As in the previous case, the district messenger system involves the battery $a$ and the signal-receiving and recording device A. One side of the line is grounded at 48, the ground connection including the condenser 49. One terminal of the relay $p$ is connected with the piping in the fire extinguisher system through the medium of a number of circuit-closing devices 50. Each circuit-closing device may consist of a pair of springs normally held apart by the fusible or other like connection 51. The other terminal of the relay is connected with the stationary contact $p^1$ through the medium of the conductor $p^2$ and the condenser $p^3$. Normally, the line circuit is closed from one side of the line through the casing of the box, through the contact wheel $p^4$ and its finger, and thence through the insulated binding post $p^5$ to the other side of the line. The other side of the line is connected with the contact $p^6$ through the medium of the conductor 52. With this arrangement, the piping of the fire extinguisher system is utilized as a portion of the grounded circuit for the condensers and the relay, and the closing of any one of the circuit-closing devices 50 will cause the charged condensers to produce a momentary impulse of current through the grounded circuit. This impulse of current will cause the relay $p$ to become energized, thereby automatically setting the box in operation, and causing the same to transmit the aforedescribed signal over the line to the central station. In this way, the operator, as previously described, is given a distinctive signal indicating the presence of fire in the building in which the master box is located. In Fig. 11, the contacts of the circuit-closing device are held apart by the fusible connections 53, which are interposed directly between the springs, rather than attached to one of the springs, as shown in Fig. 10. In Fig. 12, one spring of the circuit-closing contacts is bent up and around the other, and the two end portions of the springs are held apart by the angle-shaped piece of fusible material 54. When this fusible material softens, it readily buckles or collapses, and allows the two springs to come together.

In Fig. 19, I have illustrated a sealed valve, and also a circuit-breaking device, which are applicable to the circuit arrangement shown in Fig. 5. In said Fig. 19, the two contacts 55 and 56 are normally together. The third spring 57 is arranged in position to be engaged by the shoulder 58 on the stem of the valve. A seal 59 connects this shoulder with an ear on the box or casing 60 which incloses the said contacts. With this arrangement, the valve cannot be closed without breaking the seal 59, and without separating the contacts 55 and 56.

Referring to Fig. 22, it will be seen that the principle of my invention is applicable to a system which is not only capable of maintaining an effective supervision over a fire extinguisher system, but which is also capable of giving both a local alarm and of producing two distinct signals in case of fire, and, in addition to these, of supervising the doors and windows of a house in respect of burglars, and of affording means for telephoning and calling messengers. In this figure, the master box Q can be the same as the one shown in Fig. 1. The telephone apparatus R, and the automatic circuit-breaking devices E can also be the same as those shown in Fig. 1. The valves S of the fire extinguisher system, and also the circuit-breaking devices T, can be substantially the same as those shown in Fig. 5. The local alarm U can be connected and arranged in the same manner as the one shown in Fig. 1. Also, the subscriber's sub-station telephone apparatus V can be in all respects the same as that shown in Fig. 1. As previously described, the master box is connected through the main line with the battery a and signal-receiving and recording device A at the central station of the district messenger system. The ordinary call boxes F are distributed along the district messenger line in the usual manner. The circuit-breaking devices 40 are the same as those shown in Figs. 7 and 8. With this arrangement, the operation of any one of the automatic circuit-breaking devices E will serve to break the shunt circuit in which they are included, and thereby set the master box Q in operation. The master box, when released, then not only sounds the local alarm, but also produces the aforedescribed operation of the line lamp signal on the switchboard in front of the telephone operator. And, in addition to these signals, the master box transmits a signal over the line to the signal-receiving device A at the central station of the district messenger system. Again, the improper opening of any one of the doors or windows 61 will open the shunt circuit in which the circuit-breaking devices are included, and will thereby release the mechanism of the master box Q. This box will then, as in the previous case, transmit signals over the two lines to the telephone and district operators, and will also cause a sounding of the local alarm. So, also, should one of the valves S be closed, the circuit-breaking devices T, allotted to such valve, will be opened, and the master box will again be set in operation to transmit signals over the lines to the telephone and district messenger stations, and will cause a local alarm to sound. Thus, with my improved arrangement, one box, with a plurality of loops or shunt circuits provided with various circuit devices, is sufficient to protect the building in which it is located against either fire or burglars, and to afford an efficient supervision over the fire extinguisher system of each building.

Now it will be seen that in each instance my invention permits the circuit arrangements to conform to the requirements of the Underwriters' Association with respect to the maintenance of closed circuits. As is well known, the Underwriters' Association requires that only normally-closed circuits and constant-current batteries be employed. This is true of my invention, especially with my improved shunt arrangement, by the use of which it will be seen that the relay windings in the master box are always in a closed circuit, and that it only requires a breaking of the shunt to throw the entire current strength through the coils and windings of the relay. Furthermore, my invention renders it possible to employ a single transmitting device, substantially like the ordinary call box, for transmitting the signals over one or more lines. In other words, the arrangement permits the use of a single call box in conjunction with a great number of automatic circuit-breaking or closing devices, any one of which is capable, when operated, of setting the call box in operation. This, obviously, reduces the cost of installation and maintenance, and simplifies the system generally.

In Fig. 2, the contacts 30, 31 and 32 enable the master box mechanism to open the shunt in which the various circuit breaking devices are included. In this way, an accidental closing of the shunt after it has been opened, will not interfere with the proper working of the master box, and the desired transmission of a signal to the central station or stations.

In Fig. 23, the arrangement is substantially the same as that shown in Fig. 22, with the exception that the different kinds of circuit-breaking devices are all included in one large shunt, rather than in a plurality of shunts. In Fig. 23, the resistance coils shown in each shunt, may be employed for regulating the resistance in such a manner that the breaking of any one of the shunts will cause sufficient current to flow through the coils of the relay to energize the latter, and thereby set the master box in operation. In Fig. 23, these resistance coils are, however, unnecessary, inasmuch as only the one shunt is employed. The resistance of this one shunt will, of course, be sufficiently low to normally maintain the relay in a deënergized condition. In each case, however, it will be seen that the arrangement involves a plurality of different kinds of circuit-breaking devices, all of which are so connected with the master box that the operation of any of them will automatically release the master box, and will thereby cause a signal to be transmitted to the different stations.

The boxes F are, it will be understood, ordinary call boxes, adapted when at rest to preserve the continuity of the line or signal circuit, but adapted when operated to transmit a call signal in the ordinary and well-known manner. The battery shown at the left in Fig. 10 can be employed for energizing the electro-magnet when any of the thermostats or switches are closed.

Figs. 1 and 20 show the form of releasing magnet which I prefer to use. As thus illustrated, it will be seen that the said magnet is differentially wound, the two differential windings 5 and 7 being connected in parallel between the two limbs of the line—that is to say, between the two line terminals. It will also be seen that one winding, as previously explained, is in parallel with the conductor 4, this winding and the said conductor 4 thereby constituting a sort of shunt connection around the other winding of the magnet. In other words, the two differential windings are in shunt of each other, and one winding is in series with the conductor 4 leading through the different signal initiating devices. Although the other forms of box may be employed, the form of box shown in Figs. 1 and 20 is, I find, preferable for use in the circuits shown in Figs. 22 and 23.

What I claim as my invention is:

1. An electric signaling system, comprising a box containing signal transmitting mechanism normally in a condition to be released, a district messenger signal receiving and recording device suitably connected with said box, a telephone switchboard electrically independent of said district messenger signal service also suitably connected with said box, a plurality of heat responsive devices suitably connected with said box, a plurality of fire extinguisher valves, a switch associated with each valve, a plurality of doors and windows, a switch associated with each door and window, all of said switches being suitably connected with said box, a battery for supplying current over the telephone line, another battery for supplying current over the district messenger line, said last-mentioned battery being located at the station having the signal receiving and recording device, and electrically operated means adapted to release the mechanism of said box upon the operation of any one of said heat responsive devices or switches, whereby the operation of either a heat responsive device or a switch acts to automatically set said mechanism in operation and thereby transmit signals over the telephone and district messenger lines.

2. A signaling system comprising a master box containing signal transmitting mechanism held normally in a condition to be released, an electro-magnet in said box adapted when energized to release said mechanism, a normally closed district messenger line circuit including said magnet, and including a battery at central station for keeping said circuit normally charged, a normally open telephone line circuit, a shunt around said magnet including a number of heat responsive devices, a number of fire extinguisher valves, a switch associated with each valve, a second shunt around said magnet including said switches, a number of doors or windows, a switch associated with each door or window, and a third shunt around said magnet including said last mentioned switches, whereby the opening of any one of said shunts operates to automatically release the mechanism of said box, so as to cause the same to transmit signals over all the telephone and district messenger lines.

3. In a signaling system, the combination of a telephone line circuit, suitable switchboard apparatus involving a line signal for said line circuit, signal transmitting mechanism connected with the line circuit, a number of heat responsive devices suitably connected with said signal transmitting mechanism, a number of fire extinguisher valves, and a number of switches associated with said valves, said switches being suitably connected with said signal transmitting mechanism, together with a battery at a central station for keeping the circuit of the said heat-responsive devices normally charged, whereby the operation of any one of said heat responsive devices or switches causes said signal transmitting mechanism to operate said line signal.

4. In a signaling system, the combination of suitable telephone switchboard apparatus involving a line signal, a signal transmitting device having line connection with said switchboard apparatus, and a plurality of heat responsive devices suitably connected with said signal transmitting device, together with a battery at a central station for keeping the circuit of the said heat responsive devices normally charged, each heat responsive device when operated causing said signal transmitting device to operate said line signal.

5. The combination of a signal, a master box connected with said signal, said master box being normally in a pulled condition, an electro-magnet connected and arranged for releasing said box, said magnet having an armature engaging a movable part of the mechanism of said box, a number of switches connected with said magnet, said switches being distributed through the building in which the master box is located, a battery at the central station for keeping the circuit of said switches normally charged, each switch when operated causing sufficient current to flow through the electro-magnet to energize the latter, a catch for automatically holding said armature when the latter is attracted by the magnet, and means comprising a winding handle for causing said catch to automatically release said armature only when the box is restored to its normally pulled condition.

Signed by me at Chicago, Cook county, Illinois, this 18th day of December, 1902.

JAMES G. NOLEN.

Witnesses:
HARRY P. BAUMGARTNER,
WM. A. HARDERS.